US012772037B2

(12) United States Patent
Hartley et al.

(10) Patent No.: US 12,772,037 B2
(45) Date of Patent: Oct. 20, 2026

(54) METHOD AND SYSTEM FOR DISTRIBUTED PUBLISHER-SUBSCRIBER EVENT COMMUNICATION

(71) Applicant: GM GLOBAL TECHNOLOGY OPERATIONS LLC, Detroit, MI (US)

(72) Inventors: Steven Hartley, Pointe-Claire (CA); Frank Ghenassia, Ramat Gan (IL); Manohar S. Nemilikonda, Cumming, GA (US)

(73) Assignee: GM Global Technology Operations LLC, Detroit, MI (US)

( * ) Notice: Subject to any disclaimer, the term of this patent is extended or adjusted under 35 U.S.C. 154(b) by 894 days.

(21) Appl. No.: 18/074,037

(22) Filed: Dec. 2, 2022

(65) Prior Publication Data

US 2024/0187837 A1 Jun. 6, 2024

(51) Int. Cl.
*H04W 8/18* (2009.01)

(52) U.S. Cl.
CPC .................................... *H04W 8/18* (2013.01)

(58) Field of Classification Search
CPC ...................................................... H04W 8/18
USPC ........................................................ 455/418
See application file for complete search history.

(56) References Cited

U.S. PATENT DOCUMENTS

2015/0283174 A1 10/2015 Peterson
2015/0288636 A1* 10/2015 Yalavarty .............. H04L 51/216 709/206
2019/0173951 A1* 6/2019 Sumcad .................. H04L 67/55
2019/0371180 A1 12/2019 Hara

* cited by examiner

*Primary Examiner* — Jirapon Tulop
(74) *Attorney, Agent, or Firm* — Quinn IP Law

(57) ABSTRACT

A method and system for distributed publisher-subscriber event communication. The distributed publisher-subscriber event communication may include determining a first event published with a first service operating on a first device, determining a second device subscribing to the first event, unicasting the first event from the first device to the second device, determining a plurality of second applications operating on the second device subscribing to the first event, and multicasting the first event received at the second device to each of the second applications.

20 Claims, 2 Drawing Sheets

METHOD AND SYSTEM FOR DISTRIBUTED PUBLISHER-SUBSCRIBER EVENT COMMUNICATION

INTRODUCTION

The present disclosure relates to methods and systems for communicating events, such as but not necessarily limited to communicating events between devices according to a distributed publisher-subscriber architecture and protocol.

A software defined entity, such as but not necessarily limited to an automobile or other vehicle, may correspond with a class or type of entity manufactured to perform various operations, processes, functions, etc., with at least some of those capabilities being at least partially instantiated in software. Given the variety of such manufacturers, the design and development of software defined entities may be deployed according to a wide variety operating system and hardware environments (e.g., vehicle mechatronics, vehicle high-compute, mobile phones, and the cloud, etc.). In light of some entities employing proprietary software development, deployment, and communications platforms, one non-limiting aspect of the present disclosure foresees a need for distributed software entities running in the various environments to seamlessly discover, connect, and communicate events with each other in a transparent, simplified, and secure manner, and optionally doing so for large scale deployments and without disrupting firewalls or other security measures intended to permit devices of the software defined entities to be hidden.

SUMMARY

One non-limiting aspect of the present disclosure relates to a distributed broker method and system for communicating events with a plurality of devices hidden behind firewalls of a plurality of vehicles or other software define entities, optionally with distributed software entities running in the different environments to discover, connect, and communicate with each other in a secure and simple manner.

One non-limiting aspect of the present disclosure relates to a method for distributed publisher-subscriber communications. The method may include determining a first event published with a first service operating on a first device, determining a second device subscribing to the first event, unicasting the first event from the first device to the second device, determining a plurality of second applications operating on the second device subscribing to the first event, and multicasting the first event received at the second device to each of the second applications.

The method may include determining the second device with a first subscription manager operating on the first device and determining the second applications with a second subscription manager operating on the second device.

The method may include the first subscription manager including a first subscriber list for the first event and identifying the second device from the first subscriber list.

The method may include transmitting a first subscription request from the second subscription manager to the first subscription manager, with the first subscription request requesting the first subscription manager to include the second device within the first subscriber list and the first subscription request identifying the second device without independently identifying the second applications.

The method may include operating a first dispatcher on the first device to append a second device sink attribute to the first event when unicasting the first event from the first device to the second device, the second device sink attribute providing routing information for routing the first event to the second device.

The method may include operating a second bus dispatcher on the second device to remove the second device sink attribute from the first event before multicasting the first event to the second applications.

The method may include operating the second bus dispatcher to separately append second application sink attribute to the first event when multicasting the first event to the second applications, with the second application sink attribute uniquely identifying each of the second applications.

The method may include unicasting the first event from the first device to the second device via a gateway, the gateway having a first connection with the first device and a second connection with the second device, with the gateway processing the routing information to route the first event from the first connection to the second connection.

The method may include unicasting the first event from the first device via a first streamer operating on the first device, with the first streamer configured with a first device-to- gateway (D2G) interface operable for establishing the first connection, and unicasting the first event from the gateway to a second streamer operating on the second device, the second streamer configured with a second D2G interface operable for establishing the second connection.

The method may include determining a second event published with a second service operating on the second device, determining the first device subscribing to the second event, unicasting the second event from the second device to the first device, determining a first application operating on the first device subscribing to the second event, and unicasting the second event received at the first device to the first application.

The method may include determining a third device subscribing to the first event and the second event, unicasting the first event from the first device to the third device separately from unicasting the first event from the first device to the second device, unicasting the second event from the second device to the third device separately from unicasting the second event from the second device to the first device, determining a third application operating on the third device subscribing to the first event and a fourth application operating on the third device subscribing to the second event, and unicasting the first event received at the third device to the third application and unicasting the second event received at the third device to the fourth application.

The method may include the first device being a vehicle, the second device being a back office, and the third device being a mobile phone.

The method may include the first event including data representing a location of the vehicle, the second event including data representing a service notification for the vehicle, and the first application being a notification application, the second applications including a navigation application, a vehicle services application, a trip planning application, and a charging station application, the third application being a location application, and the fourth application being a notification application.

The method may include determining a second event published with a second service operating on the second device, determining the first device subscribing to the second event, unicasting the second event from the second device to the first device, determining a plurality of first applications operating on the first device subscribing to the second event, and multicasting the second event received at the first device to each of the first applications.

One non-limiting aspect of the present disclosure relates to a distributed publisher-subscriber system. The system may include a first device configured for determining a first event published with a first service operating thereon, determining a second device subscribing to the first event, unicasting the first event to the second device. The system may further include a second device configured for determining a plurality of second applications operating thereon subscribing to the first event and multicasting the first event received thereat to each of the second applications.

The system may further include a gateway configured for wirelessly relaying the first event from the first device to the second device according to first routing information included therewith, the first routing information identifying the second device without identifying the second applications.

The first device may include a first subscription manager configured for determining the second device from a first subscriber list associated with a first service operating on the first device, the first service producing the first event, the first subscriber list identifying the second device without identifying the second applications. The first device may further include a first dispatcher configured to append a second device sink attribute to the first event prior to unicasting of the first event to the second device, with the second device sink attribute including the first routing information.

The second device may include a second subscription manager configured for determining the second applications from a second subscriber list associated with the first service. The second device may further include a second dispatcher configured to remove the second device sink attribute from the first event before multicasting the first event and to separately append second application sink attribute to the first event before multicasting the first event to the second applications, with the second application sink attribute uniquely identifying each of the second applications.

The second device may include a second service configured to produce a second event, the second subscription manager configured for determining from a second subscriber list associated with the second service the first device as subscribing to the second event, the second dispatcher configured to append a first device sink attribute to the second event prior to unicasting of the second event from the second device to the first device, with the first device sink attribute including second routing information for with the gateway in wirelessly relaying the second event from the second device to the first device.

The first device may include the first subscription manager configured for determining from a third subscriber list associated with the second service a plurality of first applications operating on the first device as subscribing to the second event and the first dispatcher configured to remove the first device sink attribute from the second event before multicasting the second event and to separately append first application sink attribute to the second event before multicasting the second event to the first applications, with the first application sink attribute uniquely identifying each of the first applications.

One non-limiting aspect of the present disclosure relates to system for distributed publisher-subscriber communications. The system may include a first device onboard a vehicle, with the first device including a plurality of first applications configured to consume events, a plurality of first services configured to produce produced events, a first subscription manager configured to manage subscriptions for the first device, a first streamer configured to communicate with a gateway offboard the vehicle, a first dispatcher configured to manage communications between the first application, service, subscription manager, and streamer. The system may include a second device offboard of the vehicle, with the second device including a plurality of second applications configured to consume events, a plurality of second services configured to produce events, a second subscription manager configured to manage subscriptions for the second device, a second streamer configured to communicate with the gateway, and a second dispatcher configured to manage communications between the second application, service, subscription manager, and streamer.

The system may include, in response to one of the first services publishing a first event, the first subscription manager determining the second device subscribing to the first event, the first dispatcher appending a second device sink attribute to the first event, and the streamer unicasting the first event with the second device sink attribute to the gateway for relay to the second device.

The system may include, in response to receipt of the first event at the second device, the second subscription manager determining a second plurality of the second applications subscribing to the first event and the second dispatcher removing the second device sink attribute from the first event prior to multicasting the first event to the second plurality of the second applications;

The system may include, in response to one of the second services publishing a second event, the second subscription manager determining the first device subscribing to the second event, the second dispatcher appending a first device sink attribute to the second event, and the streamer unicasting the second event with the first device sink attribute to the gateway for relay to the first device.

The system may include, in response to receipt of the second event at the first device, the first subscription manager determining a first plurality of the first applications subscribing to the second event and the first dispatcher removing the first device sink attribute from the second event prior to multicasting the second event to the first plurality of the second applications.

The above features and advantages along with other features and advantages of the present teachings are readily apparent from the following detailed description of the modes for carrying out the present teachings when taken in connection with the accompanying drawings. It should be understood that even though the following Figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
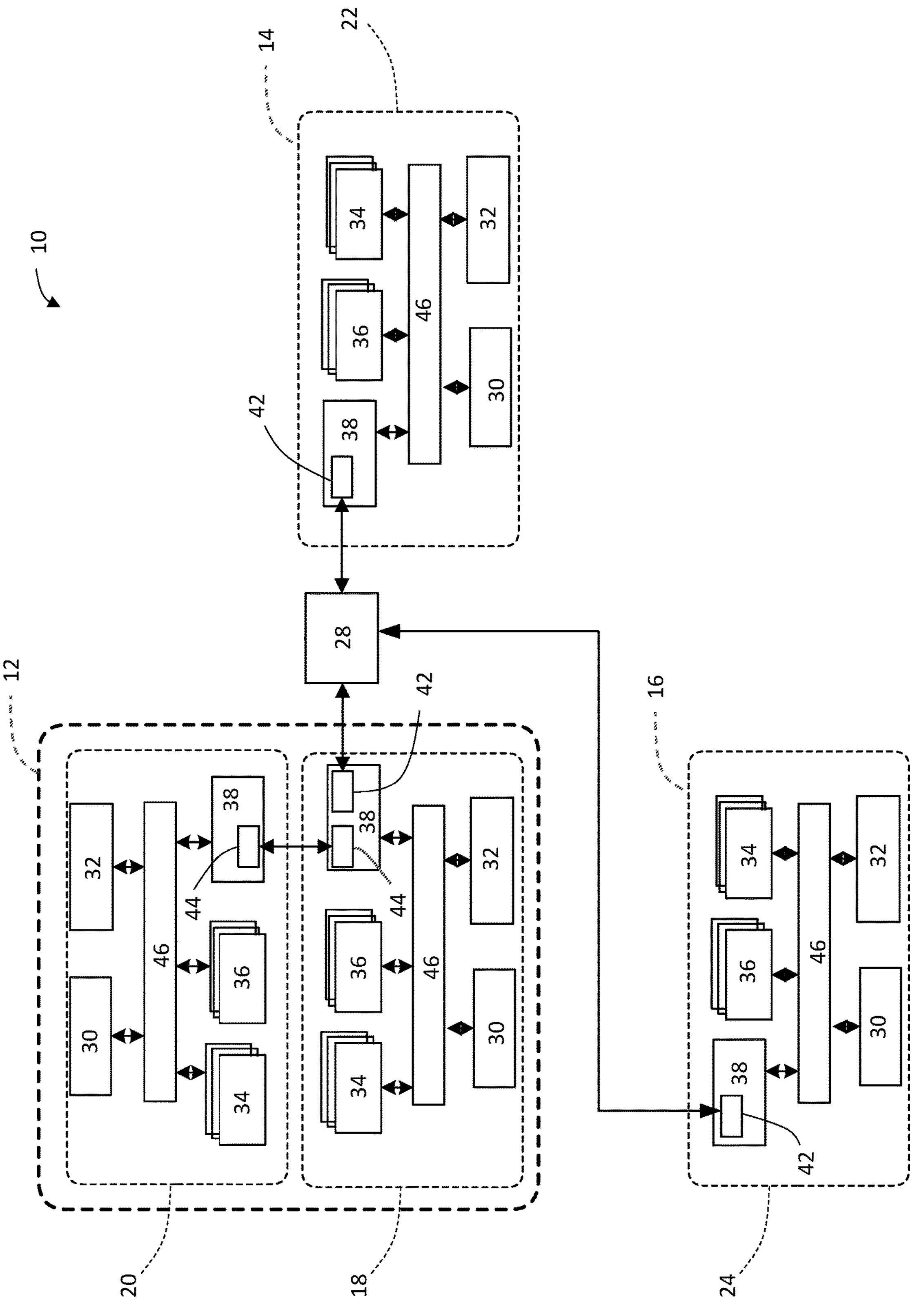
FIG. 1 illustrates a distributed publisher-subscriber system in accordance with one non-limiting aspect of the present disclosure.

FIG. 1 illustrates a distributed publisher-subscriber system 10 in accordance with one non-limiting aspect of the present disclosure. The system 10 may be configured to communicate data, information, messages, packets, etc., which may be collectively and generically referred to as cloud events or events, between a plurality of entities 12, 14, 16, such as but not necessarily limited to facilitating publisher-subscriber event related communications between software defined entities 12, 14, 16. One non-limiting aspect of the present disclosure contemplates the software defined entities 12, 14, 16 being devices included on vehicles, mobile phones, servers, etc. in need of highly scalable way for communicating events between software defined devices 18, 20, 22, 24 thereon. The system 10 may be correspondingly configured to enable such devices 18, 20, 22, 24, which may be running in different environments, to discover, connect, and communicate with each other in a secure and simple manner. The system 10 may be considered as including a distributed publisher-subscriber arrangement due to a gateway 28 between the vehicles or other entities 12, 14, 16 having the software defined devices 18, 20, 22, 24 being configured to route, relay, exchange, and otherwise facilitate communicating events therebetween without relying on a central broker to manage the routing and without relying on a central broker to manage subscriptions.

The system 10, for example, may be configured to implement the distributed publisher-subscriber arrangement through the incorporation of publisher-subscriber related messaging protocols and techniques, and advantageously, without requiring the central broker typically employed in publisher-subscriber arrangements. The system 10 may instead be configured to provide a type of publisher-subscriber architecture whereby each device 18, 20, 22, 24 may be configured to include a subscription manager 32 to manage subscriptions associated therewith. The subscription managers 32 may be independently operable to define rules and other parameters for controlling event communications between devices according to publisher-subscriber related methodologies, with the subscription managers 32 and other features described herein acting in concert to effectively provide multiple, distributed brokers, as opposed to a singular or central subscription manager or broker. While the present disclosure fully contemplates the distributed broker architecture being implement according to other messaging constructs beside publisher-subscriber, however, the leveraging of publisher-subscriber principles as described herein is believed to be particular advantageous in enabling the system 10 to scale according to the communication needs of thousands and thousands of devices 18, 20, 22, 24 expected to rely upon the contemplated event communications for software defined operations.

In the event some of the devices 18, 20, 22, 24 may be included on vehicles, it may be advantageous for vehicle manufacturers to provide the devices 18, 20, 22, 24 for purposes of instantiating devices 18, 20, 22, 24 on the vehicles capable of implementing various vehicle related operations, such as but not necessarily limited to facilitate vehicle operations associated with a virtual cockpit unit (VCU), an electronic control unit (ECU), a telematics unit (TU), an advanced driver assistance system 10 (ADAS), an engine control module (ECM), a braking control system 10 (BCS), a battery management system 10 (BMS), a navigation system 10, a ADAS compute platform (ACP), compute cluster unit (CCU), connectivity hub module (CHM), etc. The vehicles may include multiple devices 18, 20, 22, 24 onboard to provide the vehicle operations, optionally with different devices 18, 20, 22, 24 being tasked with implementing or otherwise supporting different vehicle operations. The vehicles, accordingly, may include a plurality of devices 18, 20, 22, 24 configured to facilitate various vehicle functions in a software defined manner, with each of the devices 18, 20, 22, 24 operating thereon optionally be characterized as independent execution environments having platform software components to implement the process, etc. contemplated herein.

Given the sensitivity and the ability of the devices 18, 20, 22, 24 to influence vehicle operations, particularly those influential in driving or otherwise operating the vehicle, one non-limiting aspect of the present disclosure contemplates the vehicles including a firewall or other security measure configured to limit communication with the devices 18, 20, 22, 24, such as by enabling to devices 18, 20, 22, 24 to be hidden from external influences and communications originating outside of the system 10, e.g., to prevent outside equipment from establishing device level connections with the device. The desirability of hiding the devices 18, 20, 22, 24 while also enabling the devices 18, 20, 22, 24 to communicate with devices 18, 20, 22, 24 onboard other vehicles and/or with devices onboard external servers, services, etc. The system 10 contemplates an embodiment where a portion of the devices 18, 20, 22, 24 may be included onboard a plurality of vehicles and a portion of the devices 18, 20, 22, 24 maybe included offboard the vehicles onboard other software defined entities, such as but not limiting to a back office (BO), a third party vendor, a server, or other external element. Such non-vehicle or offboard devices 18, 20, 22, 24, for example, may be tasked with managing or assisting operations of the devices 18, 20, 22, 24 onboard the vehicles and/or such offboard devices 18, 20, 22, 24 may be configured to implement their own functionality and operations based on activities of the devices 18, 20, 22, 24 onboard the vehicles. The system 10 contemplated herein is believed to be beneficial in enabling both onboard and offboard devices 18, 20, 22, 24, and as such, the differentiation between onboard and offboard devices 18, 20, 22, 24 is presented for non-limiting purposes to illustrate an implementation of the system 10 whereby the communication of events may occur between different types of software defined entities employing the devices 18, 20, 22, 24.

FIG. 1 illustrates an exemplary arrangement where a vehicle may include multiple devices 18, 20 configured for communicating events with each other and a device 22 included on a back office or other remote server and a device 24 on a mobile phone associated with an owner or other entity related to the vehicle. This exemplary arrangement is presented for non-limiting purposes and the present disclosure fully contemplates a n number of the vehicles may include n number of the devices 18, 20, 22, 24 configured for communicating events with each other and/or n number of non-vehicle entities similarly included on n number of the devices 18, 20, 22, 24 for communicating events with each other and/or the devices 18, 20, 22, 24 onboard the vehicles. The devices 18, 20, 22, 24 may include one or more applications 34. The applications 34 may perform the role of a subscriber configured to consume events (e.g., data, information, etc.), which the application 34 may in turn use to facilitate executing a corresponding application 34, process, function, etc. The devices 18, 20, 22, 24 may include one or more services 36. The services 36 may perform the role of a producer configured to publish events (e.g., data, information, etc.), which the services 36 may in turn distribute for consumption by the applications 34 or other entities. For presentation simplicity, and without limitation, the events consumed and produced by the applications 34 and the services 36 may be referred to as subscribed events when being consumed by one of the applications 34 and published events when being produced by one of the services 36. The same event may accordingly be considered as a published event when being published by a service 36 and as a subscribed event when being consumed by an application 34.

The devices 18, 20, 22, 24 may include the subscription manager 32 configured to manage a plurality of subscriptions for the associated device 18, 20, 22, 24. The subscriptions may be used for identifying one or more subscribed topics and one or more published topics for the associated device 18, 20, 22, 24, or more specifically, for the applications 34 and/or the services 36 thereon. The subscriptions may accordingly define the events to be communicated to the applications 34 and from the services 36 on a per device basis, and for each device on a per application 34 and/or service 36 basis, according to topics, categories, groups, data types, etc. relevant thereto. In this manner, the applications 34 may individually subscribe to one or more of the events and the services 36 may individually subscribe to providing one or more of the events. Each of the devices 18, 20, 22, 24 may be configured to include the subscription manager 32 such that the subscription managers 32 may be correspondingly and locally distributed throughout the system 10 at each of the devices 18, 20, 22, 24. The subscription managers 32 may be configured in this manner to manage the publisher-subscriber design pattern for the associated device, thereby eliminating a need for the devices 18, 20, 22, 24 to rely upon a central broker to support the publisher-subscriber design pattern.

The subscription managers 32 may be distinguished from a discovery manager 30 included on the devices 18, 20, 22, 24 to as a feature for the devices 18, 20, 22, 24 to discover each other, their location (address), properties, etc. The devices 18, 20, 22, 24 may include a streamer 38 configured to provide wired and/or wireless communications. The streamer 38 may be configured with a device-to-cloud (D2C) or a device-to-gateway (D2G) interface 42 to provide device level communications with a network offboard of the vehicle or other entity 12, 14, 16 and a device-to-device (D2D) interface 44 configured to provide device level communications with another device onboard the same vehicle or entity 12, 14, 16. The capabilities of the streamer 42 to provide communications with other devices 18, 20, 22, 24 onboard the same vehicle or entity may be beneficial in establishing a domain. The domain within the corresponding vehicle or entity 12, 14, 16 may be used to establish a collection of devices 18, 20 capable of being associated with a common Domain Name System (DNS) or other type of nomenclature. The devices 18, 20, 22, 24 may include a dispatcher 46 configured to manage communications between the applications 34, services 36, subscription manager 32, and streamer 42. The dispatcher 46 may be configured to inspect, package, alter, and otherwise add data to and/or remove data from events and/or other messages or packets communicated thereover, including capabilities for appending sink attributes and removing sink attribute when facilitating unicasting and multicasting events between devices 18, 20, 22, 24 and/or applications 34 or services 36.

Figure 2:
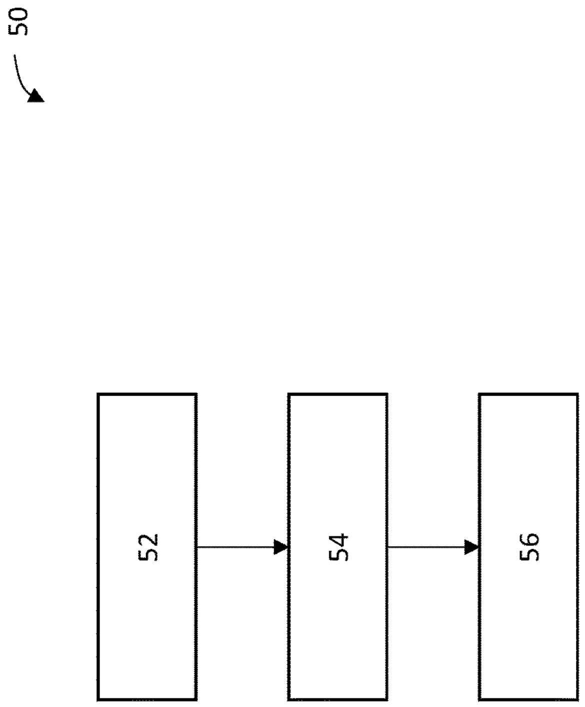
FIG. 2 illustrates a flowchart of a method for publisher-subscriber event communication in accordance with one non-limiting aspect of the present disclosure.

FIG. 2 illustrates a flowchart 50 of a method for publisher-subscriber event communication in accordance with one non-limiting aspect of the present disclosure. Block 52 relates to a publisher-subscriber registration process for the applications 34 and services 36 to register for events. The registration process may include the applications 34 and services 36 at each device 18, 20, 22, 24 exchanging registration information with the subscription manager 32 thereon, such as by exchanging messages therewith using the dispatcher 46. The applications 34 may register with the subscription manager 32 for desired events, such as events produced by the services 36 on the same device 18, 20, 22, 24 and/or the events produced by the services 36 operating on other devices 18, 20, 22, 24. While the present disclosure contemplates a wide variety of applications 34, the applications 34 onboard the vehicle 12 and the mobile phone 16 may include a notification application 34 configured to provide notification to vehicle occupants, a navigation application 34 configured to facilitate navigating the vehicle, such as according to information from a global positioning system 10 (GPS), an infotainment application 34 configured to multi-media interactions with vehicle occupants, etc. Likewise, the applications 34 on the back office 14 may include a vehicle services application 34 for scheduling maintenance services 36 for vehicles, a trip planning application 34 or planning vehicle trips, a charging station application 34 for locating charging stations, etc. The services 36 may register with the subscription manager 32 to produced events, such as events each service 36 is configured to produce, i.e., the events to be consumed by the applications 34 and/or other entities. As with the applications 34, the present disclosure contemplates a wide variety of services 36. The services 36 associated with the vehicle 12 and the mobile phone 16, for example, may include a location service 36 configured for generating data representing a location of the vehicle 12. Likewise, the services 36 on the back office 14 may include a maintenance notification service 36 for indicating when maintenance or software updates are needed, a location service 36 for indicating current location of the vehicles, etc.

The registration process may include the subscription managers 32 on the devices 18, 20, 22, 24 individually generating a subscription list or other mechanism for tracking the subscriptions of the applications 34 and services 36 thereon. In the event of an application 34 registering for services 36 on the same device 18, 20, 22, 24 or within the same domain, the subscription list may include application 34 sink attributes for use with the corresponding dispatcher 46 to facilitate transmitting the events of the locally produced services 36 directly to the local applications 34 without routing through the gateway 28. In the event of an application 34 registering for services 36 on a remote device, the subscription list may include device sink attributes for the local device 18, 20, 22, 24 instead of the individual applications 34 such that the device sink attributes may include routing information needed for the gateway to relay events thereto from the remote devices 18, 20, 22, 24 having the subscribed to services 36. The device sink attributes may be insufficient for the gateway 28 to identify the individual applications 34 subscribing the services 36, i.e., the device sink attributes may identify the device 18, 20, 22, 24 and not the individual applications 34 thereon. The registration process may include the subscription manager 32 on each devices 18, 20, 22, 24 generating a publication list for each service 36 thereon, optionally with data representing the type, content, nature, etc. of the data being published by the corresponding services 36.

The subscription managers 32 on each device 18, 20, 22, 24 may be configured to facilitate communications with each other in order to apprise each other of the services 36 thereon. This exchange of subscription related information may be used to enable the subscription managers 32 to apprise the local applications 34 of services 36 available from local services 36 as well as the services 36 available from other devices 18, 20, 22, 24. One aspect of the present disclosure contemplates the subscription managers 32 sharing the subscription related information without providing sink attributes for the individual applications 34 and services 36, and instead, providing sink attributes for the associated device. The subscription managers 32 may include application 34 and/or service 36 sink attributes for the local applications 34 and/or services 36 for purposes of facilitating message routing over the local dispatcher 46 and common or more generic device sink attributes for use in event routing outside of the local device 18, 20, 22, 24. As described below in more detail, the use of the device sink attributes instead of the application 34 and/or service 36 sink attributes when communicating with remote devices 18, 20, 22, 24 may be beneficial in ameliorating the quantity of events communicated from one device 18, 20, 22, 24 to another when the receiving device 18, 20, 22, 24 includes multiple applications 34 requesting the same event. Rather than transmitting the same event multiples times from one device 18, 20, 22, 24 to each application 34 on the receiving device 18, 20, 22, 24, the present disclosure may unicast a singular instance of the event to the receiving device 18, 20, 22, 24 whereafter the receiving device 18, 20, 22, 24 may thereafter multicasts the event to each application 34 subscribing thereto.

Block 54 relates to any event production process, which for exemplary and non-living persons described with respect to a service 36 operating on the vehicle 12 generating a first event, a service 36 operating on the back office 14 generating a second event, and a service 36 operating on the mobile phone 16 generating a third event. The event generation process may occur concurrently on the devices 18, 20, 22, 24 at the vehicle 12, back office 14, and mobile phone 16 or in another sequence or with the devices 18, 20, 22, 24 generating the corresponding events at different times. The present disclosure notes the first, second, and third events to demonstrate advantageous capabilities of the present disclosure in leveraging the distributed capabilities of the subscription service 36 managers residing on the individual devices 18, 20, 22, 24 to facilitate distributed publisher-subscriber event communication, which may include communicating a single instance of the event from one device 18, 20, 22, 24 to another regardless of the quantity of applications 34 on the receiving device requesting the same event. The publisher-subscriber event communication, at least in this regard, may be characterized by an originating device 18, 20, 22, 24 unicasting an event to each subscribing device 18, 20, 22, 24, with the subscribing device 18, 20, 22, 24 thereafter multicasting the event to each subscribing application 34 thereon.

Block 54 relates an event communication process associated with facilitating publisher-subscriber communication of the events. The event communication process may include the subscription managers 32 on the device 18, 20, 22, 24 producing or publishing the events determining one or more application 34 subscribing thereto. The subscription managers 32 may be configured to identify the subscribing applications 34 in response to a request from the local dispatcher 46, e.g. the local dispatcher 46 may detect a service 36 publishing an event and make an inquiry with the service 36 subscription manager 32 to ascertain where the event should be communicated. In the event of one or more local applications 34 subscribing to an event, e.g., one of the applications 34 on the vehicle 12 subscribing to the first event, the subscription manager 32 may provide an application 34 sink attribute to the dispatcher 46 that the dispatcher 46 may then use to directly route the event to the local application 34. In the event of one or more remote applications 34 subscribing to an event, e.g., applications 34 on the mobile phone 16 or the back office 14 subscribing to the first event, the subscription manager 32 may provide a device sink attribute to the dispatcher 46 for each of the devices 22, 24 having at least one subscribing application 34, which the dispatcher 46 may then appended to the event for use in unicasting the event separately to each of the devices 22, 24 having one of or the subscribing applications 34, the dispatcher 46 may fan out or otherwise multicast the events without appending device sink attributes, and/or the dispatcher 46 may provide a URL or other locator the subscribing device for download or other retrieval of the event. In respond to receipt of the event, the receiving device 18, 20, 22, 24, or more specifically the dispatcher 46 thereon, may request the subscription manager 32 to provide application 34 sink attributes for the subscribing applications 34 whereupon the dispatcher 46 may remove the device sink attribute included with the event and append one of the application 34 sink attributes to multicast the event to each subscribing application 34 thereon. With respect to the first event, the event communication process may include the vehicle device 18 separately unicasting the first event to the back office 14 and the mobile phone 16 whereafter the dispatcher 46 at the back office device 22 may multicasting first event to a plurality of applications 34 thereon and the dispatcher 46 at the mobile phone device 24 may unicast the event to an application 34 thereon in the event a singular application 34 requests the first event. With respect to the second event, the event communication process may include the back office device 22 separately unicasting the second event to the vehicle and the mobile phone devices 18, 22 whereafter the dispatchers 46 thereat may multicast or unicast the event to the subscribing applications 34 thereon.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for distributed publisher-subscriber communications, comprising:

determining a first event published with a first service operating on a first device;

determining a second device subscribing to the first event with a first subscription manager operating on the first device;

unicasting the first event from the first device to the second device;

determining a plurality of second applications operating on the second device with a second subscription manager operating on the second device, the plurality of second applications subscribing to the first event; and multicasting the first event received at the second device from the second device to each of the plurality of second applications.

2. The method according to claim 1, further comprising:

the first subscription manager including a first subscriber list for the first event; and identifying the second device from the first subscriber list.

3. The method according to claim 2, further comprising:

transmitting a first subscription request from the second subscription manager to the first subscription manager, the first subscription request requesting the first subscription manager to include the second device within the first subscriber list, the first subscription request identifying the second device without independently identifying the plurality of second applications.

4. The method according to claim 1, further comprising:

operating a first dispatcher on the first device to append a second device sink attribute to the first event when unicasting the first event from the first device to the second device, the second device sink attribute providing routing information for routing the first event to the second device.

5. The method according to claim 4, further comprising:

operating a second bus dispatcher on the second device to remove the second device sink attribute from the first event before multicasting the first event to the plurality of second applications.

6. The method according to claim 5, further comprising:

operating the second bus dispatcher to separately append second application sink attribute to the first event when multicasting the first event to the plurality of second applications, the second application sink attribute uniquely identifying each of the plurality of second applications.

7. The method according to claim 4, further comprising:

unicasting the first event from the first device to the second device via a gateway, the gateway having a first connection with the first device and a second connection with the second device, the gateway processing the routing information to route the first event from the first connection to the second connection.

8. The method according to claim 7, further comprising:

unicasting the first event from the first device via a first streamer operating on the first device, the first streamer configured with a first device-to-gateway (D2G) interface operable for establishing the first connection; and unicasting the first event from the gateway to a second streamer operating on the second device, the second streamer configured with a second D2G interface operable for establishing the second connection.

9. The method according to claim 1, further comprising:

determining a second event published with a second service operating on the second device;

determining the first device subscribing to the second event;

unicasting the second event from the second device to the first device;

determining a first application operating on the first device subscribing to the second event; and unicasting the second event received at the first device from the first device to the first application.

10. The method according to claim 9, further comprising:

determining a third device subscribing to the first event and the second event;

unicasting the first event from the first device to the third device separately from unicasting the first event from the first device to the second device;

unicasting the second event from the second device to the third device separately from unicasting the second event from the second device to the first device;

determining a third application operating on the third device subscribing to the first event and a fourth application operating on the third device subscribing to the second event; and unicasting the first event received at the third device from the third device to the third application and unicasting the second event received at the third device from the third device to the fourth application.

11. The method according to claim 10, wherein:

the first device is a vehicle;

the second device is a back office; and the third device is a mobile phone.

12. The method according to claim 11, wherein:

the first event includes data representing a location of the vehicle;

the second event includes data representing a service notification for the vehicle;

the first application is a notification application;

the plurality of second applications include a navigation application, a vehicle services application, a trip planning application, and a charging station application;
the third application is another location application; and
the fourth application is another notification application.

13. The method according to claim 1, further comprising:
determining a second event published with a second service operating on the second device;
determining the first device subscribing to the second event;
unicasting the second event from the second device to the first device;
determining a plurality of first applications operating on the first device, the plurality of first applications subscribing to the second event; and
multicasting the second event received at the first device from the first device to each of the plurality of first applications.

14. A distributed publisher-subscriber system, comprising:
a first device configured for:
determining a first event published with a first service operating thereon;
determining a second device subscribing to the first event with a first subscription manager operating on the first device; and
unicasting the first event to the second device; and
a second device configured for:
determining a plurality of second applications operating thereon with a second subscription manager operating on the second device, the plurality of second applications subscribing to the first event; and
multicasting the first event received thereat from the second device to each of the plurality of second applications.

15. The distributed publisher-subscriber system according to claim 14, further comprising:
a gateway configured for:
wirelessly relaying the first event from the first device to the second device according to first routing information included therewith, the first routing information identifying the second device without identifying the plurality of second applications.

16. The distributed publisher-subscriber system according to claim 15, wherein:
the first device includes:
the first subscription manager configured for determining the second device from a first subscriber list associated with a first service operating on the first device, the first service producing the first event, the first subscriber list identifying the second device without identifying the plurality of second applications; and
a first dispatcher configured to append a second device sink attribute to the first event prior to unicasting of the first event to the second device, the second device sink attribute including the first routing information; and
the second device includes:
the second subscription manager configured for determining the plurality of second applications from a second subscriber list associated with the first service; and
a second dispatcher configured to remove the second device sink attribute from the first event before multicasting the first event and to separately append second application sink attributes to the first event before multicasting the first event to the plurality of second applications, the second application sink attributes uniquely identifying each of the plurality of second applications.

17. The distributed publisher-subscriber system according to claim 16, wherein:
the second device includes a second service configured to produce a second event;
the second subscription manager is configured for determining from a second subscriber list associated with the second service the first device as subscribing to the second event;
the second dispatcher is configured to append a first device sink attribute to the second event prior to unicasting of the second event from the second device to the first device, the first device sink attribute including second routing information for with the gateway in wirelessly relaying the second event from the second device to the first device;
the first subscription manager is configured for determining from a third subscriber list associated with the second service a plurality of first applications operating on the first device as subscribing to the second event; and
the first dispatcher is configured to remove the first device sink attribute from the second event before multicasting the second event and to separately append first application sink attributes to the second event before multicasting the second event to the plurality of first applications, the first application sink attributes uniquely identifying each of the plurality of first applications.

18. A system for distributed publisher-subscriber communications, comprising:
a first device onboard a vehicle, the first device including:
a plurality of first applications configured to consume a plurality of second events;
a plurality of first services configured to produce produced a plurality of first events;
a first subscription manager configured to manage subscriptions for the first device, and determine a second device subscribing to the plurality of first events;
a first streamer configured to communicate with a gateway offboard the vehicle;
a first dispatcher configured to manage communications between the first application, service, the first subscription manager, and the first streamer; and
the second device offboard of the vehicle, the second device including:
a plurality of second applications configured to consume the plurality of first events;
a plurality of second services configured to produce the plurality of second events;
a second subscription manager configured to manage subscriptions for the second device, and determine the plurality of second applications operating on the second device;
a second streamer configured to communicate with the gateway; and
a second dispatcher configured to manage communications between the second application service, the second subscription manager, and the second streamer.

19. The system according to claim 18, wherein:

in response to one of the first services publishing a particular first event of the plurality of first events, the first subscription manager determines the second device subscribing to the particular first event, the first dispatcher appends a second device sink attribute to the particular first event, and the streamer unicasts the particular first event with the second device sink attribute to the gateway for relay to the second device; and in response to receipt of the particular first event at the second device, the second subscription manager determines a second plurality of the second applications subscribing to the particular first event, the second dispatcher removes the second device sink attribute from the particular first event prior to multicasting the particular first event to the second plurality of the second applications.

20. The system according to claim 19, wherein:

in response to one of the second services publishing a particular second event of the plurality of second events, the second subscription manager determines the first device subscribing to the particular second event, the second dispatcher appends a first device sink attribute to the particular second event, and the streamer unicasts the particular second event with the first device sink attribute to the gateway for relay to the first device; and in response to receipt of the particular second event at the first device, the first subscription manager determines a first plurality of the first applications subscribing to the particular second event, the first dispatcher removes the first device sink attribute from the particular second event prior to multicasting the particular second event to the first plurality of the second applications.

* * * * *